C. BALOUGH.
RADIUS ROD FOR MOTOR VEHICLES.
APPLICATION FILED FEB. 27, 1914.
1,173,407.
Patented Feb. 29, 1916.
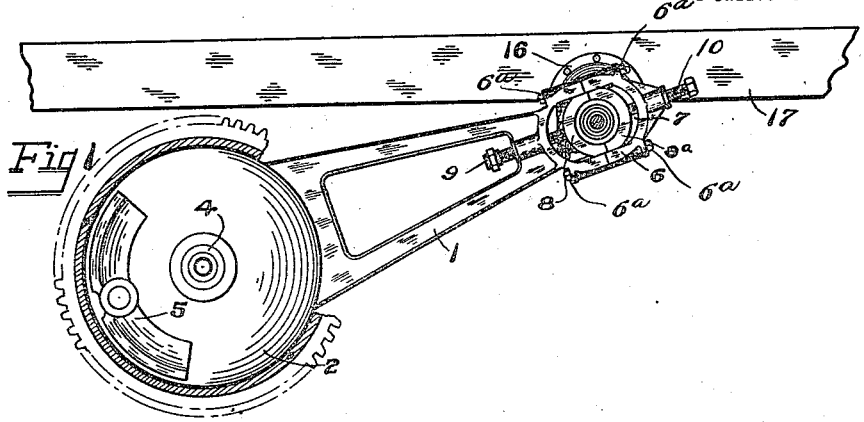
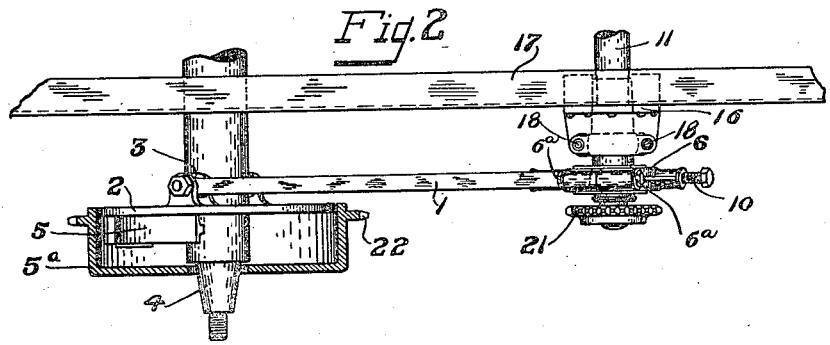
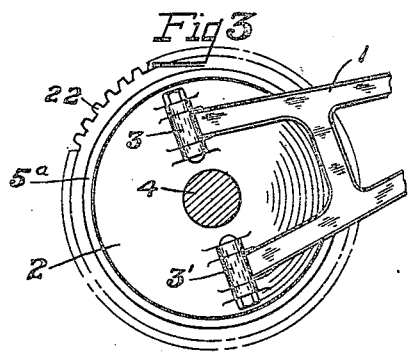
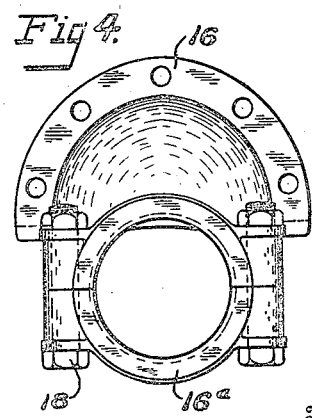
Witnesses
Esther E. Pfeifer
Chas. J. Mleh
Inventor
Charles Balough
By Haley & Bowman
Attorney

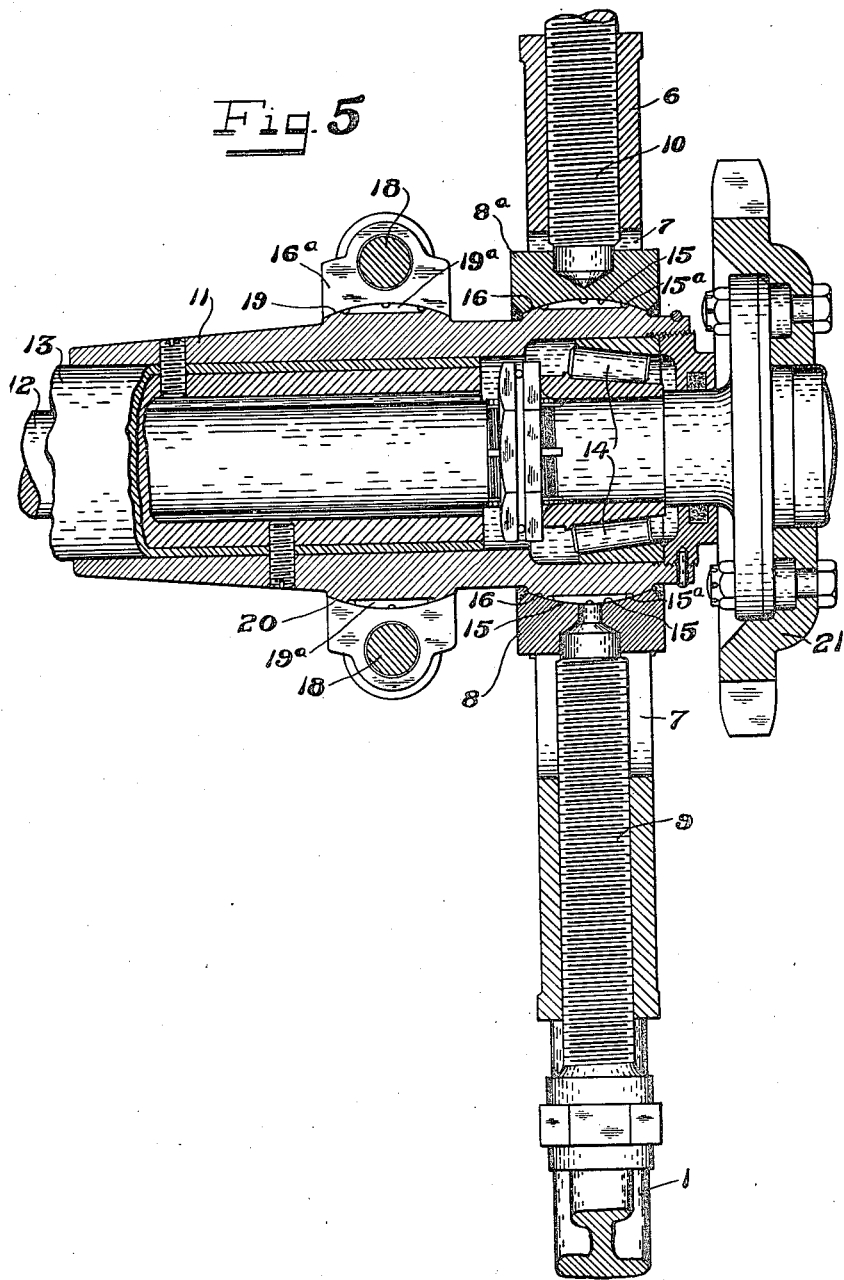

UNITED STATES PATENT OFFICE.

CHARLES BALOUGH, OF SPRINGFIELD, OHIO, ASSIGNOR TO THE KELLY-SPRINGFIELD MOTOR TRUCK COMPANY, OF SPRINGFIELD, OHIO, A CORPORATION OF OHIO.

RADIUS-ROD FOR MOTOR-VEHICLES.

1,173,407.

Specification of Letters Patent.   Patented Feb. 29, 1916.

Application filed February 27, 1914.   Serial No. 821,411.

*To all whom it may concern:*

Be it known that I, CHARLES BALOUGH, a citizen of Austria-Hungary, residing at Springfield, in the county of Clark and State of Ohio, have invented certain new and useful Improvements in Radius-Rods for Motor-Vehicles, of which the following is a specification.

This invention relates to improvements in radius rods for motor vehicles, particularly motor vehicles of the heavy truck type in which the driving wheels are driven by chains from a jack shaft.

The object of my invention is to provide a radius rod which, while permitting the ready adjustment between the rear axle and the jack shaft for tightening or loosening the driving chains, will be so constructed that all torsional stresses, due to driving or braking force, will be permitted without affecting the adjusting screws or other adjusting parts.

In the accompanying drawings,—Figure 1 is a side view, partly in section, of so much of a motor vehicle as is necessary to illustrate my invention. Fig. 2 is a top plan of the same, also partly in section. Fig. 3 is a side elevation showing the connection between the radius rod and the rear axle. Fig. 4 is a detail of the supporting bracket for the jack-shaft. Fig. 5 is a transverse section of the jack-shaft and its bearing and of a portion of the radius rod, showing the manner of connecting the rod and shaft.

Like parts are represented by similar characters of reference throughout the several views.

In the accompanying drawings, 1 represents the radius rod, which may be of the usual bifurcated trussed form. The rear bifurcated portion of this rod is connected to a spider 2, swiveled on the rear axle 4; the connection between the rod and spider preferably being a pivotal one through the medium of the pivots 3 and 3', but if desired, the rod will be rigidly connected to said spider. This spider carries some of the braking devices, the shoe 5 and drum 5ª only being shown in the present case, as these braking devices do not enter into the present invention; the drum 5ª being secured in the usual way to the rear driving wheel (not shown).

The forward part of the rod is formed with a slotted or elongated opening 7. This opening, if desired, may be formed in a solid portion of the rod, but in the present case the rod is shown provided with a separate portion 6 for convenience in manufacture, held to the main portion by bolts 6ª. Slidably mounted in the slotted opening, 7, is a bearing block, for convenience in manufacture shown as made in two parts, 8 and 8ª, and screw-threaded in the respective parts of the radius rod are adjusting screws 9 and 10, the ends of which fit in recesses in the respective members of the bearing block for the purpose of holding the same in any position of adjustment in the slotted opening.

The block members 8 and 8ª embrace the bearing 11 for the jack-shaft 12, this bearing 11 being rigidly secured to the jack-shaft casing 13; anti-friction rollers 14 being preferably interposed between the shaft and the bearing proper 11. Each of the bearing block members 8 and 8ª is provided with a concave bearing face 15 which are fitted to convex bearing faces 16 on the exterior of the bearing 11. The bearing 11 is supported in the bracket 16 secured to the main frame 17 of the vehicle. The bracket 16 has a removable portion 16ª for the purpose of allowing the parts to be readily assembled, this removable portion being secured to the main portion by bolts 18, and it is also provided with interior concave bearing faces 19 fitted to convex bearing faces 20 on the exterior of the bearing 11. The jack-shaft has secured to the outer end thereof the usual sprocket-wheel 21 over which passes a chain (not shown) to the sprocket teeth 22 on the drum 5ª. Each of the exterior rounded bearing faces 16 and 19 are provided with peripheral and transversely-arranged oil-grooves 15ª and 19ª, for the purpose of lubricating the parts. By this construction it will be seen that the jack-shaft and rear driving wheel may be readily adjusted with respect to each other through the medium of the screws 9 and 10. It will be further seen that by reason of the rounded bearing surfaces described, all torsional strain upon the radius rod and the adjusting devices, due to braking and driving stresses, is obviated; these stresses being transmitted to the bracket 16; whatever strain there is upon the adjusting screws 9 and 10 being a direct one and not of a torsional or bending nature, It will further be noticed that the radius rod is formed to all intents and purposes of one solid structure, as distinguished from those radius rods which have been in common use which are constructed of two parts joined together by adjusting screws. This manner of constructing the rod and providing means for adjusting said rod with respect to the bearings which it carries furnishes a much stronger structure to resist torsional strains than the old construction referred to.

Having thus described my invention, I claim:

1. In a device of the character described, a rear axle, a jack-shaft, a radius rod, a connection between said rod and axle, a bearing-block carried by said rod having rounded bearing faces fitted to rounded bearing faces associated with said shaft, and means for adjusting said block and rod in a straight line relatively each other to vary the relation between said shaft and axle.

2. In a device of the character described, a main frame, an axle and jack-shaft associated with said frame, a radius rod, a connection between said rod and axle, a bearing block carried by said rod having rounded bearing faces fitted to rounded bearing surfaces associated with said shaft together with means for adjusting said block and rod relatively each other to vary the relation between said shaft and axle, and rounded bearing faces between said frame and shaft.

3. In a device of the character described, a rear axle, a radius rod pivotally connected with said axle to allow the parts a lateral movement with respect to each other, a jack-shaft, a bearing block carried by said rod having rounded bearing faces fitted to rounded bearing faces associated with said shaft, and means for adjusting said block and said rod relatively each other to vary the relation between said shaft and axle.

4. In a device of the character described, a rear axle, a jack-shaft, a bearing for said jack-shaft, a radius rod connected with said axle, a block supported by said radius rod and embracing said bearing, means for adjusting said rod and block relatively each other and rounded bearing faces between said block and bearing.

5. In a device of the character described, a main frame, an axle and jack shaft associated with said frame, a radius rod vertically hinged at one end to said axle and a universal joint between the other end of said radius rod and the jack shaft, for the purpose specified.

6. In a device of the character described, a main frame, an axle and jack shaft associated with said frame, an intermediate member supported on said axle, a radius rod, a vertically hinged joint between the one end of said radius rod and said intermediate member, and a universal joint between the other end of said radius rod and said jack shaft, for the purpose specified.

7. In a device of the character described, a main frame, a rear axle and jack shaft associated with said frame, intermediate member supported on said axle, a radius rod one end of which is hinged directly to said intermediate member whereby it may swing laterally on said member, and a universal joint between the other end of said radius rod and said jack shaft, substantially as described.

In testimony whereof, I have hereunto set my hand this 21st day of February 1914.

CHARLES BALOUGH.

Witnesses:
CHAS. I. WELCH,
ESTHER E. PFEIFER.